(12) United States Patent
Weening et al.

(10) Patent No.: US 9,501,481 B2
(45) Date of Patent: Nov. 22, 2016

(54) GENERATING A CONTENT STREAM INCLUDING CONTENT ITEMS FROM MULTIPLE APPLICATIONS EXECUTING ON A CLIENT DEVICE

(71) Applicant: Flipboard, Inc., Palo Alto, CA (US)

(72) Inventors: Geert H. Weening, San Francisco, CA (US); Vaibhav Sharma, Mountain View, CA (US); Mark Rietveld, Palo Alto, CA (US); Jing Zhao, Beijing (CN)

(73) Assignee: Flipboard, Inc., Palo Alto, CA (US)

( * ) Notice: Subject to any disclaimer, the term of this patent is extended or adjusted under 35 U.S.C. 154(b) by 343 days.

(21) Appl. No.: 14/327,536

(22) Filed: Jul. 9, 2014

(65) Prior Publication Data

US 2016/0012053 A1    Jan. 14, 2016

(51) Int. Cl.
*G06F 17/30* (2006.01)
*G06Q 10/10* (2012.01)

(52) U.S. Cl.
CPC ... *G06F 17/30029* (2013.01); *G06F 17/30991* (2013.01); *G06Q 10/107* (2013.01)

(58) Field of Classification Search
CPC .................................................. G06F 17/301
See application file for complete search history.

(56) References Cited

U.S. PATENT DOCUMENTS

2013/0297604 A1*  11/2013  Sutedja ................ G06Q 10/107
                                                                  707/737

OTHER PUBLICATIONS

Perez, Snowball Debuts A Unified Inbox For All Your Messaging Apps, Oct. 8, 2014, accessed Aug. 10, 2016 at https://techcrunch.com/2014/10/08/snowball-debuts-a-unified-inbox-for-all-your-messaging-apps/.*

* cited by examiner

*Primary Examiner* — William Spieler
(74) *Attorney, Agent, or Firm* — Fenwick & West LLP (57) ABSTRACT

A content stream including content items retrieved from various applications executing on a client device is presented by the client device. A set of content items associated with a topic matching a stream topic associated with the content stream is identified from the retrieved content items. Quality scores are determined for each content item in the set providing a measure of a user's interest in each content item. A display set of content items is selected based on the quality scores, with one or more content items from the display set displayed based on a stream template. The stream template includes multiple slots each associated with one or more content items, and specifies a relative position of different slots to each other.

20 Claims, 3 Drawing Sheets

GENERATING A CONTENT STREAM INCLUDING CONTENT ITEMS FROM MULTIPLE APPLICATIONS EXECUTING ON A CLIENT DEVICE

BACKGROUND

This invention generally relates to presenting content on a client device, and more specifically to gathering content from applications for presentation on a client device.

Publishers provide an increasing amount of content items to users through digital distribution channels, and users access these content items through various applications executing on client devices. A user may access content received through a variety of these applications. However, as a user accesses content through an increasing number of applications, the amount of time the user devotes to accessing content becomes overly time consuming. For example, a user may have an application that frequently provides content that is irrelevant to the user but that rarely delivers highly engaging content. Because this application infrequently provides engaging content, the user may more frequently access other applications that more consistently provide engaging content. Consequently, the user may miss occasional highly engaging content items from certain applications.

SUMMARY

A content stream presents content retrieved from various applications executing on a client device to a user of the client device (such as a mobile communication device, tablet, computer, and any other suitable computing system). In various embodiments, the content stream presents content items associated with a common topic or associated with similar topics. For example, content items associated with social media applications are aggregated into a social media content stream, and news articles or other content items associated with news applications are aggregated into a news stream. According to expected user interest in various content items, content items from various applications are identified and presented in a content stream.

Content items associated with topics based on characteristics of the content items are retrieved from various applications executing on a client device. Characteristics of a content item used to determine a topic associated with the content item include metadata associated with the content item, the application from which the content item was retrieved, or one or more keywords associated with the content item. Content items associated with one or more topics matching a stream topic associated with a content stream are identified. For example, if at least a threshold number of topics associated with a content item match a stream topic associated with a content stream, the content item is identified for inclusion in the content stream. Content items identified for inclusion in the content stream are evaluated to determine a measure of a user's interest in each content item, with a quality score determined for each identified content item based at least in part on the measure of the user's interest in each identified content item. A quality score for a content item may also account for diversity of content presented by the content stream and visual appeal of the content item. Based on the quality scores, content items are associated with slots in a stream template specifying the relative position of content items to each other, and the content items are displayed by the client device based on the positions of slots in the stream template.

In one embodiment, the content items are displayed using a scrollable interface, allowing a user to navigate between various content items. Additionally, a user may provide one or more inputs to the client device (e.g., a swiping gesture) to be presented with content items associated with a different stream topic. If the user selects a content item presented using the stream template, an application associated with the selected content item is executed, allowing the user to interact with the selected content item using the application.

The figures depict various embodiments of the present invention for purposes of illustration only. Alternative embodiments of the structures and methods illustrated herein may be employed without departing from the principles of the invention described herein.

DETAILED DESCRIPTION

Overview

A content stream retrieves content from applications executing on a client device (such as a mobile communication device, tablet, computer, or any other suitable computing system) to generate a personalized content stream for a user of the client device based on the retrieved content. Applications executing on the client device may generate content or retrieve content from other sources. The content stream may track user selections of content and user preferences for content, and the content stream may account for the user selections and preferences when generating the personalized stream of content for the user. For example, user selections of content, user preferences for content, as well as other information may be used to infer topics likely to be relevant to a user, and content items associated with one or more of the inferred topics are selected for inclusion in a personalized stream of content. In some embodiments, user selections of content and user preferences for content are communicated to a content stream server, which infers one or more topics likely to be relevant to the user based on the user selections, user preferences, or any other suitable information. When presenting content items to a user, the content stream may account for relevance of various content items to the user. Thus, the content stream allows the user to more easily consume content by presenting content from multiple applications in an easily navigable interface.

The content stream may be include multiple streams that each include content matching one or more stream topics. Stream topics may be based on an application from which content items are retrieved, keywords associated with content items, or a genre associated with applications from which content items are retrieved. For example, a stream includes content items retrieved from applications that receive articles from online news sources (such as news organization websites), and another stream includes content items associated with one or more applications retrieving content from one or more social networking systems with which the user maintains an account. As used herein, "content items," may include textual articles, images, videos, audio files, products for sale, social media content (e.g., content posted on a social networking system by users or other entities), advertisements, links, check-in events, page posts, comments, and any other types of content capable of presentation to a user via the content stream or via one or more applications.

System Architecture

Figure 1:
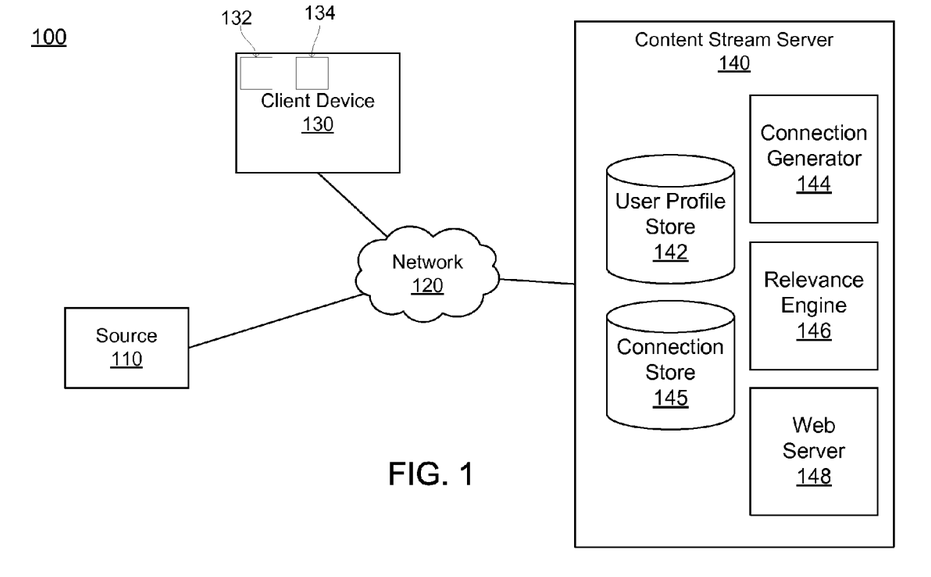
FIG. 1 is a block diagram of a system environment in which a content stream application operates, in accordance with an embodiment.

FIG. 1 is a block diagram of one embodiment of a system environment 100 in which a client device 130 generates a content stream. The system environment 100 shown by FIG. 1 comprises one or more sources 110, a network 120, the client device 130, and a content stream server 140. In alternative configurations, different and/or additional components may be included in the system environment 100.

A source 110 is a computing system capable of providing various types of content to an application executing on a client device 130. Examples of content provided by a source 110 include text, images, video, audio, web feeds, social media content, messages, or other suitable data. Examples of social media content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source 110, regardless of its composition, may be referred to herein as a "content item," or as "content." A content item may include various types of content elements such as text, images, video, audio, interactive media, links, and a combination thereof. An application executing on the client device 130 receives content items from a source 110 or accesses a source 110 to retrieve content items.

The sources 110 communicate with the client device 130 and the content stream server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.1, worldwide interoperability for microwave access (WiMAX), 3G, 4G, code division multiple access (CDMA), or digital subscriber line (DSL). Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML), extensible markup language (XML), or JavaScript Object Notation (JSON). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone, or another suitable device. In one embodiment, the client device 130 executes a content stream application allowing a user of the client device 130 to interact with content items from applications on the client device 130. For example, an application generating a content stream executing on the client device 130 requests content items from various applications executing on the client device 130 for presentation to a client device user. In another embodiment, the client device 130 interacts with a source 110 and the content stream server 140 through an application programming interface (API) running on a native operating system of the client device 130, such as IOS® or ANDROID™. While FIG. 1 shows a single client device 130, in various embodiments, any number of client devices 130 may communicate with the content stream server 140. Different client devices 130 may have different characteristics such as different processing capabilities, different connection speeds over the network 120, and different device types.

In one embodiment, the client device 130 sends user information and actions to the content stream server 140, which generates information describing relevance of different content items to a user of the client device 130 based on the user information or actions. The client device 130 receives the information describing content item relevance from the content stream server 140 and may use the information describing relevance of various content items when selecting content items for inclusion in a content steam. As further described below in conjunction with FIG. 2, the client device 130 generates one or more content streams for presentation to a user based on content items obtained from applications executing on the client device 130. For example, the client device 130 determines a layout of content items within a stream relative to each other based on information associated with a user, such as the information describing the relevance of various content items to the user, and generates a content stream including the content items arranged according to the determined layout for presentation to the user via a display device 132. This allows the user to access content items from various applications via the content stream in a format that enhances the user's interaction with and consumption of the content items. For example, the content stream server 140 provides a user with content items in a scrolling format, in which the content items presented by the display device 132 scroll over time to vary the content items that are presented. By presenting content items in a scrolling format, the client device 130 allows a user to interact with content items from multiple applications in an integrated format without navigating through various application-specific interfaces.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 130 have display devices 132 with different display areas, different resolutions, different aspect ratios, different display dimensions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, a microphone (e.g., to receive voice commands) or any other device capable of receiving input from a user. Hence, inputs may include a touch input, a gesture input, an alphanumeric input, an input received from a pointing device, a voice command, an input based on vision tracking, and a combination thereof. Additionally, the client device may include multiple input devices 134 in some embodiments. An input received via the input device 134 when a content stream is presented may be processed by the client device 130, so the received input is communicated to an application associated with an application associated with a content item associated with the received interaction.

The content stream server 140 receives user information and information describing user interactions with content from the client device 130 and other sources. Based on the received user information and information describing user interactions, the content stream server 140 determines information describing relevance of various content items to a user and provides the information describing relevance of the content items to the client device 130. For example, the content stream server 140 receives content preferences indicated by a user and login information to a social networking system from the client device 130. This information allows the content stream server 140 to infer a user's interest in one or more topics associated with content items and to provide information describing the user's interest in the one or more topics to the client device 130. In this example, using the information describing the user's interest in the one or more topics, the client device 130 selects content items for presentation via a content stream based at least in part on the user's interest in one or more topics and topics associated with content items, increasing the user's interaction with content items via the content stream by including content items associated with a topic in which the user is likely to have an interest.

The content stream server 140 shown in FIG. 1 includes a user profile store 142, a connection generator 144, a connection store 145, a relevance engine 146, and a web server 148. In other embodiments, the content stream server 140 may include additional, fewer, or different components for various applications. Conventional components such as network interfaces, security functions, load balancers, failover servers, management and network operations consoles, and the like are not shown so as to not obscure the details of the system architecture.

In one embodiment, each user of the content stream server 140 is associated with a user profile, which is stored in a user profile store 142. A user profile includes declarative information about a user that was explicitly shared by the user and may also include profile information inferred by the content stream server 140. In one embodiment, a user profile includes multiple data fields, each describing one or more attributes of the corresponding social networking system user. Examples of attributes stored in a user profile include biographic, demographic (e.g., age, gender, occupation, education, socioeconomic status), and other types of descriptive information, such as gender, hobbies or preferences, location (e.g., residence, birthplace, check-in locations), or other suitable information. The user profile store 142 may also include information for accessing one or more social networking systems or other types of sources 110 (e.g., a user name, a password, an access code) that a user has authorized the content stream server 140 to access.

A user profile in the user profile store 142 also includes data describing interactions by a corresponding user with content items presented by the client device 130. For example, a user profile includes a content item identifier, a description of an interaction with the content item corresponding to the content item identifier, and a time when the interaction occurred. Content items a user previously interacted with may be retrieved by the content stream server 140 using the content item identifiers in the user's user profile, allowing the content stream server 140 to identify characteristics of content items with which the user previously interacted. For example, the content stream server 140 identifies topics associated with content items with which the user previously interacted and identifies one or more topics likely to be of interest to the user based on the frequency or amount of interactions with content items associated with various topics; as an example, the content stream server 140 identifies topics associated with at least a threshold number or percentage of content items with which the user previously interacted as topics likely to be of interest to the user. Although user profiles in the user profile store 142 are frequently associated with individuals, allowing the client device 130 to present individuals relevant content items, user profiles may also be stored for entities such as businesses or organizations. This allows one or more client devices 130 associated with an entity to present users with content items determined to be relevant to the entity by the content stream server 140.

The connection generator 144 receives information describing interactions between users and content items presented by the client device 130. Based on the interactions, the connection generator 144 determines connections between various content items, connections between users and content items, or connections between users of the content stream server 140. For example, the connection generator 144 identifies when users accessing content via a content stream generated by an application associated with the content stream server 140 and executing on the client device 130 provide feedback about a content item, access a content item, share a content item with other users, or perform other actions with content items. In some embodiments, the connection generator 144 retrieves data describing user interaction with content items from the user's user profile in the user profile store 142. Alternatively, user interactions with content items are communicated to the connection generator 144 when the interactions are received by the content stream server 140. The connection generator 144 may account for temporal information associated with user interactions with content items. For example, the connection generator 144 identifies user interactions with a content item within a specified time interval or applies a decay factor to identified user interactions based on times associated with interactions. The connection generator 144 generates a connection between a user and a content item if the user's interactions with the content item satisfy one or more criteria. In one embodiment, the connection generator 144 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety If multiple content items are connected to a user, the connection generator 144 establishes implicit connections between each of the content items connected to the user. In one embodiment, the connection generator 144 maintains a user content graph identifying the implicit connections between content items connected to a user. In one embodiment, weights associated with connections between a user and content items are used to determine weights associated with various implicit connections between content items. User content graphs for multiple users of the content stream server 140 are combined to generate a global content graph describing connections between various content items presented via applications executing on client devices 130 and associated with the content stream server 140 based on user interactions with various content items. For example, the global content graph is generated by combining user content graphs based on mutual connections between various content items in user content graphs.

In one embodiment, the connection generator 144 generates an adjacency matrix from the global content graph or from multiple user content graphs and stores the adjacency matrix in the connection store 145. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 145 includes various adjacency matrices determined from various user content graphs; the adjacency matrices may be analyzed to generate an overall adjacency matrix for content items presented by the content stream application on the client device 130. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 144 may also determine a social proximity between users of the content stream server 140 based on interactions between users and content items. The content stream server 140 determines social proximity, or "social distance," between users using a variety of techniques. For example, the content stream server 140 analyzes additional users connected to each of two users of the content stream server 140 within a social networking system to determine the social proximity of the two users. In another example, the content stream server 140 determines social proximity between a user and an additional user by analyzing the user's interactions with content items posted by the additional user, whether the content items are presented using the content stream server 140 or on another social networking system. Additional examples for determining social proximity between users of the content stream server 140 are described in U.S. patent application Ser. No. 13/905, 016, which is incorporated by reference in its entirety. In one embodiment, the connection generator 144 determines a connection confidence value between a user and an additional user of a the content stream server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the content stream server 140 stores a connection between the user and the additional user in the connection store 145.

Using data from the connection store 145, the relevance engine 146 generates data indicating a user's interest in content items. The relevance engine 146 may also use data from the user profile store 142 describing interactions between a user and content items to infer a user's interest in content items. For example, content items having an implicit connection of at least a threshold weight to a content item with which the user interacted are inferred to be of interest to the user. The relevance engine 146 may also analyze content items for one or more similar attributes to content items with which a user previously interacted. For example, content items having a common keyword, a common author, a common source 110, a common category, a common topic, or any other suitable common attribute with content items with which the user previously interacted are identified as likely to be relevant to the user. Based on a candidate content item having similar attributes to a content item with which a user has interacted, the candidate content item is inferred to be of interest to the user. As another example, the relevance engine 146 infers a user has an interest in content items having one or more attributes, or a threshold number of attributes, in common with a content item with which an additional user having at least a threshold connection weight with the user has interacted. Data from the relevance engine 146 may indicate a user's interest in a content item or may indicate how various attributes of content items affect a user's interest in various content items. Data describing a user's interest in various content items generated by the relevance engine 146 is communicated to a client device 130 corresponding to the user through the web server 148. In another embodiment, an application associated with the content stream server 140 and executing on the client device 130 performs the functions described above in conjunction with the relevance engine 146.

The web server 148 links the content stream server 140 via the network 120 to one or more client devices 130, as well as to the one or more sources 110. The web server 148 serves web pages, as well as other content, such as JAVA®, FLASH®, XML and so forth. The web server 148 may retrieve content item from one or more sources 110. Additionally, the web server 148 communicates with the client device 130 to send information describing user interest in content items and to receive information describing user interactions with content items, user preferences for content items, or other suitable information. The web server 148 may provide application programming interface (API) functionality to send data directly to native client device operating systems, such as IOS®, ANDROID™, WEBOS®, BlackberryOS or to applications executing on a client device 130.

Figure 2:
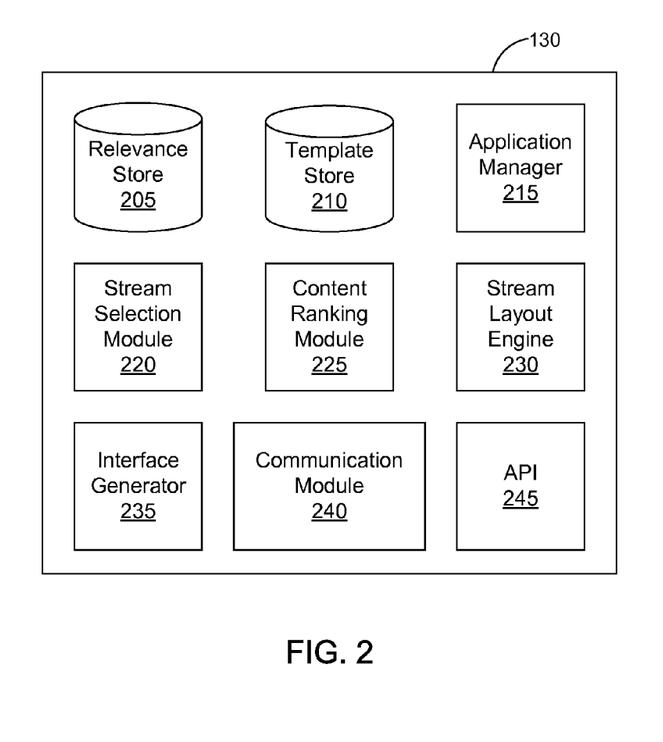
FIG. 2 is a block diagram of a content stream application implemented on a client device, in accordance with an embodiment.

FIG. 2 is a block diagram of one embodiment of an architecture of a client device 130. In the example of FIG. 2, the client device 130 includes a relevance store 205, a template store 210, an application manager 215, a stream selection module 220, a content ranking module 225, a stream layout engine 230, an interface generator 235, a communication module 240, and an application programming interface (API) 245. The client device 130 also includes one or more applications (not illustrated), which retrieve content items from a source 110 (or a data store on the client device 130) and present the retrieved content items to a user of the client device 130. In other embodiments, the client device 130 may include additional, fewer, or different components than those described in conjunction with FIG. 2. Conventional components such as network interfaces, security functions, load balancers, failover servers, management and network operations consoles, and the like are not shown so as to not obscure the details of the system architecture.

The relevance store 205 stores data indicating relevance of content items to a user of a client device 130. A relevance of a content item to the user provides a measure of the user's interest in the content item. Based on data in the relevance store 205, the content ranking module 225 determines the user's potential interest in various content items for presentation. The data indicates indicating relevance of content items to the user may specify attributes (e.g., a keyword, an author, a source 110, a category, or a topic) of content items determined to be of interest to the user. For example, data in the relevance store 205 indicates that content items about Olympic skiing are of interest to a user. The relevance store 205 periodically receives updated data indicating relevance of various content items to the user from the relevance engine 146. Alternatively or additionally, data in the relevance store 205 may also indicate relevance of one or more specific content items to a user. For example, the client device 130 obtains information from the content stream server 140 about the user's likely interest in one or more content items. As described above in conjunction with FIG. 1, the relevance engine 146 infers a user's potential interest in the one or more content items based on prior interactions by the user with content items and provides the client device with information describing the user's potential interest in the one or more content items. In one embodiment, the content ranking module 225 determines a user's expected interest in one or more content items without retrieving information from the content stream server 140.

The template store 210 includes stream templates each describing a spatial arrangement ("layout") of content items relative to each other in a content stream for presentation by a client device 130. A stream template includes one or more slots, each configured to present one or more content items. In some embodiments, slots in a stream template may be configured to present a particular type of content item or to present a content item having one or more specified characteristics. For example, a slot in a stream template is configured to present an image while another slot in the stream template is configured to present text data. Each slot has a size (e.g., small, medium, or large) and an aspect ratio. One or more stream templates may be associated with types of client devices 130, allowing content items to be presented in different relative locations and with different sizes when the content items are viewed using different client devices 130. Additionally, slots of stream templates may be associated with applications or sources 110, allowing an application or a source 110 to specify the size or aspect ratio of the slot presenting content items received from the application or from the source 110.

The application manager 215 identifies content items from various applications executing on the client device 130 for presentation to a user of the client device 130. The stream selection module 220 selects content items from the identified content items for inclusion in a content stream. To identify content items from applications, the application manager 215 receives content items from applications through the API 245. For example, the application manager 215 receives news article content items about Nordic combined competitions from an application that specializes in news about obscure sports. In one embodiment, the application manager requests content items from content applications, which provide content items to the application manager 215 in response to the requests.

The application manager 215 also communicates with applications to respond to user selections of content items received via one or more input devices 134. In one embodiment, a user selects a content item presented in a content stream, and the application manager 215 communicates a request for the content item to an application associated with the selected content item, which launches the application to present the selected content item. For example, the content stream displays a preview of a content item including a title and a representative image. When the user selects the preview of the content item using the input device 134, the application manager 215 initiates the application associated with the content item and instructs the application to present the content item in full. Hence, the application manager 215 transfers presentation of a content item from a content stream to an application associated with the content item when the content item is selected.

The stream selection module 220 receives candidate content items collected by the application manager 215 and selects content items for presentation by a contents stream from the candidate content items. In one embodiment, the stream selection module 220 selects content items for inclusion into a content stream as candidate content items associated with one or more topics matching one or more stream topics associated with the content stream. A topic associated with a candidate content item may be determined from one or more characteristics of a candidate content item. Example characteristics of a candidate content item include an application from which the candidate content item was retrieved, a genre of application from which the candidate content item was retrieved, a source 110 associated with the candidate content item, a genre of source 110 associated with the candidate content item, a category associated with the candidate content item, a type associated with the candidate content item, or one or more keywords (e.g., a person, a place, an event, an object, an entity) associated with the candidate content item. A candidate content item may be explicitly associated with one or more topics (e.g., in associated metadata) or the stream selection module 220 assigns one or more topics to the candidate content item based on its characteristics. For example, the stream selection module 220 assigns topics to a candidate content item based on keywords associated with one or more topics matching or similar to keywords extracted from text included in the candidate content item.

A content stream is associated with one or more stream topics. Stream topics associated with the content stream may be specified based on one or more settings included in an application executing on the client device 130 and associated with the content stream server 140. Alternatively or additionally, a user of the application executing on the client device 130 and associated with the content stream server 140 specifies one or more stream topics associated with one or more content streams. In one embodiment, the stream selection module 220 selects content items for inclusion into a content stream that have at least a threshold number or percentage of topics matching or similar to stream topics associated with the content stream. For example, a content stream about the Winter Olympics is associated with stream topics including "curling," "speed skating," and an identifier of an application created by the Olympics organizing committee. The stream selection module 220 selects content items having at least one topic in common with the stream topics for inclusion into the content stream about the Winter Olympics.

The content ranking module 225 receives content items selected for inclusion in a content stream by the stream selection module 220 and determines a quality score for one or more of the content items. Content items within a content stream are ranked according to their associated quality scores, and the stream layout engine 230 generates a stream layout specifying the relative positioning of content items within the content stream based at least in part on the ranking. In one embodiment, the content ranking module 225 determines the quality score for a content item based at least in part on a relevance score providing a measure of the user's expected interest in the content item. A user's interest in a content item depends in part on the general appeal of the content item to various users of the content stream server 140 and in part on the user's interest in topics associated with the content item. The content ranking module 225 may use information retrieved from the content stream server 140 describing a content item's popularity among multiple users of the content stream server 140 to estimate the general appeal of the content item. Example information describing a content item's popularity among multiple content stream server users includes a total number of interactions with the content item (e.g., views, comments, shares) by users of the content stream server 140, a percentage of a certain type of interaction to the total number of interactions with the content item, or any other suitable information. To estimate the user's expected interest in a content item, the content ranking module 225 may use information from the relevance store 205 describing relevance of the content item to the user. Information describing relevance of a content item to a user may be based on information stored in the user profile store 142 such as previous interactions between the user and a content item, user demographics, user location, a stated user preference, a preference inferred for the user from connections or prior interactions, and a combination thereof. Additionally, information describing relevance of a content item to a user may also be based on attributes of the content item (e.g., one or more keywords, an author, a source 110, a category, a topic, one or more additional users connected to the content item).

Based in part on the determined relevance scores, the content ranking module 225 determines a quality score for various content items selected for presentation in a content stream. In one embodiment, the quality score associated with a content item provides a measure of likely visual interest in the content item based on elements of the content item. For example, a content item including an image element has a higher quality score than another content item including only textual elements. As another example, a content item including an animation content element has a higher quality score than a content item including an image content element but not an animation content element. In one embodiment, the quality score is based in part on a determination of whether a content item includes data capable of being presented by a content stream. For example, if the content item has image content elements with file formats that the content stream application does not support, the content item receives a lower quality score. In some embodiments, a content item's relevance score is combined with information describing elements of the content item, so a higher relevance score of a content item may offset the presence of less visually interesting elements in the content item.

In one embodiment, the quality scores enhance diversity of content items presented by a content stream by penalizing content items that are similar to other content items having at least a threshold position in the ranking. For example, a content item and an additional content item associated with the same topic, or with similar topics, have at least the threshold position in the ranking based on their quality scores. The content ranking module 225 applies a penalty to the quality score of the content item or to the additional content item based on a number of content items associated with a topic matching or similar to a topic associated with the content item or the additional content item. In one embodiment, the content ranking module 225 sorts content items by topic and ranks content items within each topic by their quality scores. In this example, the quality score of a content item is penalized by an amount proportional to a number of content items associated with a similar topic and having a higher quality score than the content item. Hence, a highest ranked content item associated with a topic has a higher quality score than other content items associated with the topic.

Based on content items selected by the stream selection module 220 for inclusion in a content stream, the quality scores associated with the selected content items by the content ranking module 225, and stream template from the template store 210, the stream layout engine 230 generates a content stream. Based on the content items from the stream selection module 220, the stream layout engine 230 identifies candidate stream templates from the template store 210, scores the candidate stream templates based on characteristics of the slots in different candidate stream templates and based on characteristics of the content items. Based on the scores associated with candidate stream templates, the stream layout engine 230 selects a stream template and associates various content items from the stream selection module 220 with one or more slots in the selected stream template to generate a stream layout where the content items are presented relative to each other and sized based on their associated slots. When associating a content item with a slot, the stream layout engine 230 may associate the content item with a slot configured to present a specific type of content item or to present content items having one or more specified characteristics. In one embodiment, the stream layout engine 230 associates content items with slots based in part on quality scores associated with content items. For example, content items associated with higher quality scores are associated with slots of the template associated with content regions that are more prominently presented.

The interface generator 235 maintains instructions associating actions performed by the client device 130 with inputs received via the content stream. For example, instructions maintained by the interface generator 235 associate types of inputs or specific inputs received via an input device 134 of a client device 130 with modifications to content presented by the content stream. As an example, if the input device 134 is a touch-sensitive display, the interface generator 235 includes instructions associating different gestures with navigation through content items presented via a content stream or navigation between various content streams associated with different topics. Instructions from the interface generator 235 are communicated to an application generating the content stream or another application presenting content via the display device 132 of the client device 130. For example, when the client device 130 receives an input selecting a content item presented in a content stream, the interface generator 235 executes instructions to present the selected content item in an application associated with the selected content item. Hence, based on instructions stored in the interface generator 235, the client device 130 processes inputs received via an input device 134 to modify content presented via the client device 130.

In one embodiment, the interface generator 235 presents the content stream on a lock screen of the client device 130.

Generally, a lock screen is an interface presented when the client device 130 is in a state of reduced functionality where the client device 130 accepts a reduced set of inputs. The lock screen may also be presented when the client device 130 is initially powered on or resumes activity after a period of inactivity. In some embodiments, the lock screen provides functionality for accessing other interfaces of the client device 130, and may include functionality for verifying an identity of a user of the client device 130 (e.g., a pass code or another required sequence of inputs) before accessing other interfaces of the client device 130. Presenting a content stream on a lock screen allows a user of the client device 130 to quickly identify content items likely to be of interest to the user without extensive interaction with the client device. For example, a content stream displays previews of content items as part of an interface presented by a lock screen of the client device 130. Alternatively or additionally, the interface generator 235 displays the content stream as part of a navigable home interface, which is presented when the client device 130 is configured to accept inputs for accessing various applications, browsers, and programs executing on the client device 130. For example, content items from the content stream are interspersed on a home interface with icons that may be selected with an input to initiate various applications.

The communication module 240 transmits data from the client device 130 to the content stream server 140 via the network 120. Additionally, the communication module 240 receives data via the network 120 (e.g., data from the content stream server 140) and communicates the received data to one or more components of the client device 130. For example, the communication module 240 is a wireless transceiver configured to transmit data using one or more wireless communication protocols. Example wireless communication protocols include: Global System of Mobile (GSM), Code Division, Multiple Access (CDMA), General Packet Radio Service (GPRS), third-generation (3G) mobile, fourth-generation mobile (4G), High Speed Download Packet Access (HSDPA), High Speed Uplink Packet Access (HSUPA), Long-Term Evolution (LTE) and Worldwide Interoperability for Microwave Access (WiMAX). In some embodiment, the communication module 240 enables connection to the network 120 through a wired communication protocol, such as Ethernet. While FIG. 2 shows a single communication module 240, multiple communication modules 240 may be included in a client device 110 in some embodiments.

The API 245 includes instructions for exchanging information between various applications (e.g., browsers or other programs) executing on the client device 130. For example, the API 245 includes instructions allowing an application generating a content stream to retrieve content items from various applications executing on the client device 130. The API 245 may provide applications executing on the client device 130 with instructions to communicate one or more content items to the stream selection module 220. As another example, the API 245 specifies instructions supported by various applications to retrieve content items in response to requests from the application manager 215 for content items.

For purposes of illustration, FIG. 2 describes various functionalities provided by the client device 130. However, in other embodiments, the above-described functionality may be provided by the content stream server 140, or may be provided by a combination of the content stream server 140 and a content stream application executing on a client device 130. For example, the content stream server 140 may retrieve content items from one or more sources 110 and identify a set of content items for inclusion in a content stream. Additionally, the content stream server 140 may determine a quality score for content items in the identified set and communicate instructions for generating stream layouts of content items to the client device 130 for generating the content stream.

Stream Templates

Figure 3:
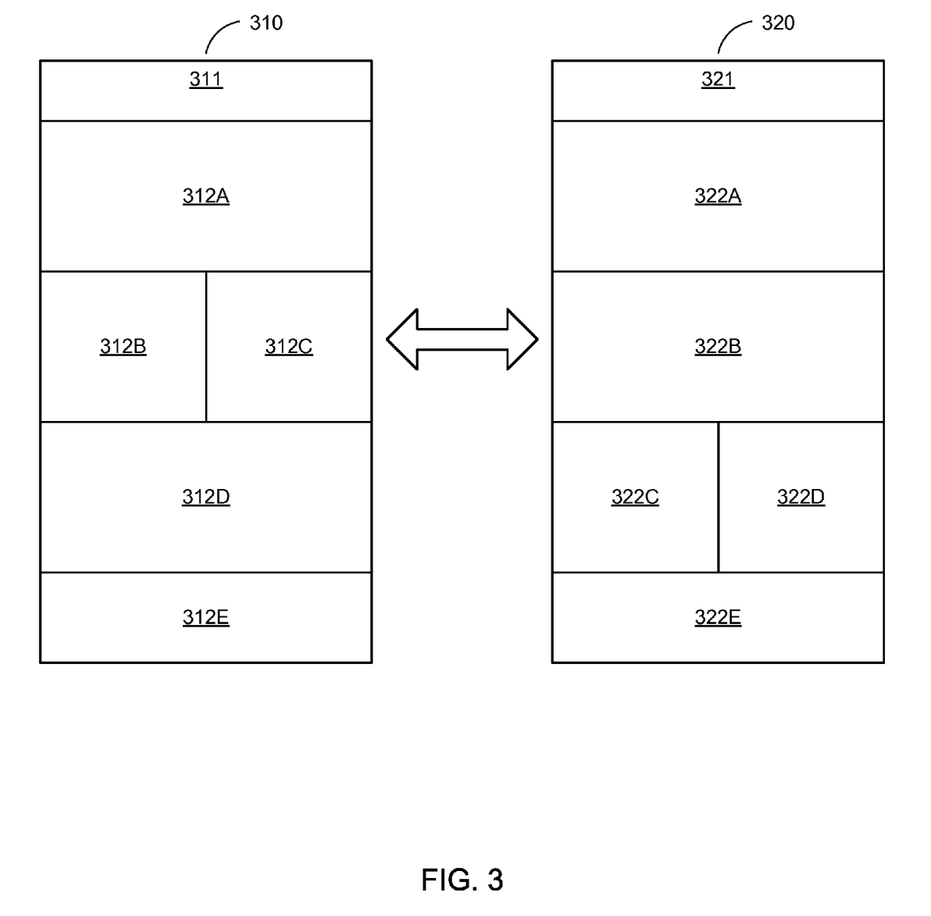
FIG. 3 illustrates an example user interface for presenting content items in a content stream application using a template, in accordance with an embodiment.

FIG. 3 illustrates an example stream template 310 having multiple rectangular slots each configured to present a content item. In other embodiments, stream templates with different configurations of slots may be used by the stream layout engine 230 to present one or more content items for presentation in a content stream. As described above in conjunction with FIG. 2, in some embodiments, one or more slots in a stream template 310 are reserved for presenting content items having specific characteristics or for presenting a specific type of content item. In one embodiment, the size of a slot may be specified as a fixed aspect ratio or fixed dimensions. Alternatively or additionally, the size of a slot may be flexible, where the aspect ratio or one or more dimensions of a slot is specified as a range, such as a percentage of a reference or a base dimension. Arrangement of slots within a stream template may also be hierarchical. For example, a stream template is organized hierarchically, where an arrangement of slots may be specified for the entire stream template or for one or more portions of the stream template.

In the example of FIG. 3, the stream layout engine 230 populates slots in a stream template 310 with content items based on information from the content ranking module 225 about the content items. Information identifying the stream template 310 and associations between content items and slots in the stream template 310 is stored and used to generate the content stream. For example, to present a content stream to a user, the stream layout engine 230 identifies the stream template 310 from the template store 210 and retrieves content items from applications or sources 110. The stream layout engine 230 generates data or instructions associating content items with slots within the stream template 310. Hence, the generated stream layout includes various "content regions" presenting one or more content items in locations specified by slots included in the stream template 310. A slot may be associated with a measure of prominence providing a measure of the visibility of content presented in a location specified by the slot relative to other slots included in the stream template 310. For example, a slot associated with in a higher position than other slots in a stream template has a higher measure of prominence than slots associated with lower positions. The stream layout engine 230 may associates slots with content items based on a comparison of a slot's measure of prominence and a content item's quality score. For example, a slot with a relatively higher measure of prominence is associated with a content item having a relatively higher measure of quality. In one embodiment, differences between a content item's quality score and measures of prominence associated with various slots are determined, and the content item is associated with a slot having a minimum difference between the slot's measure of prominence and the content item's quality score.

A content region 311, 312A-E may present image data, animation data, video data, text data, or any other information retrieved from one or more content items. In the example of FIG. 3, the content region 311 presents information identifying a topic associated with content presented in a content stream based on the stream template 310 or a common characteristic of content items included in a content stream presented using the stream template 310. Example information identifying a topic include a description of a category (e.g., news, social media), a name of an application associated with content items presented in the content stream, or the name of a source 110 from which one or more content items presented in the content stream are retrieved. As an additional example, the content region 311 specifies a name of a social networking system user associated with content items presented in the content stream. The content regions 312A-312E each present one or more content items selected for inclusion in the content stream by the content ranking module 225. Content items included in the content stream are associated with a stream topic associated with the content stream; for example, the content items include text and/or images associated with the stream topic or are associated with a topic matching or similar to the stream topic.

FIG. 3 shows an additional stream template 320 associated with an additional content stream. The additional stream template 320 includes a content region 321 presenting information identifying a topic associated with content presented in the additional content stream based on the additional stream template 320 or a common characteristic of content items included in a content stream presented using the additional stream template 320. Further, the additional stream template 320 includes content regions 322A-322E that each present one or more content items associated with the additional content stream. In one embodiment, the client device 130 presents the content stream or the additional content stream based on one or more inputs received by an input device 134. For example, when the content stream is presented and a specified gesture or other input is received by the input device 134, the client device 130 presents the additional content stream. Subsequent inputs through the input device 134 may cause presentation of different content streams associated with different topics using different stream templates. For example, a horizontal swiping gesture captured by the input device causes the content stream presented using stream template 310 to slide off a vertical edge of the display device 132 while the additional content stream presented based on the additional stream template 320 slides onto the opposite vertical edge of the display device 132.

In one embodiment, the stream template 310 includes more content regions than the display device 132 of the client device 130 may present at one time, and when an input is received by the input device 134, additional content regions from the stream template 310 are presented. For example, if a vertical swipe gesture is received, content regions 312 presented by the stream template 310 scroll along a vertical axis of the display device 132 so additional content regions are displayed using the stream template 310. For example, after receiving a vertical swipe gesture, one or more additional content regions 312 slide onto the display device from a horizontal edge of the display device 132 while one or more currently displayed content regions 312 disappear through an opposite horizontal edge of the display device 132. Some content regions may partially appear along a boundary of the display device 132, as shown by content regions 312E and 322E in FIG. 3.

Content Stream Generation

Figure 4:
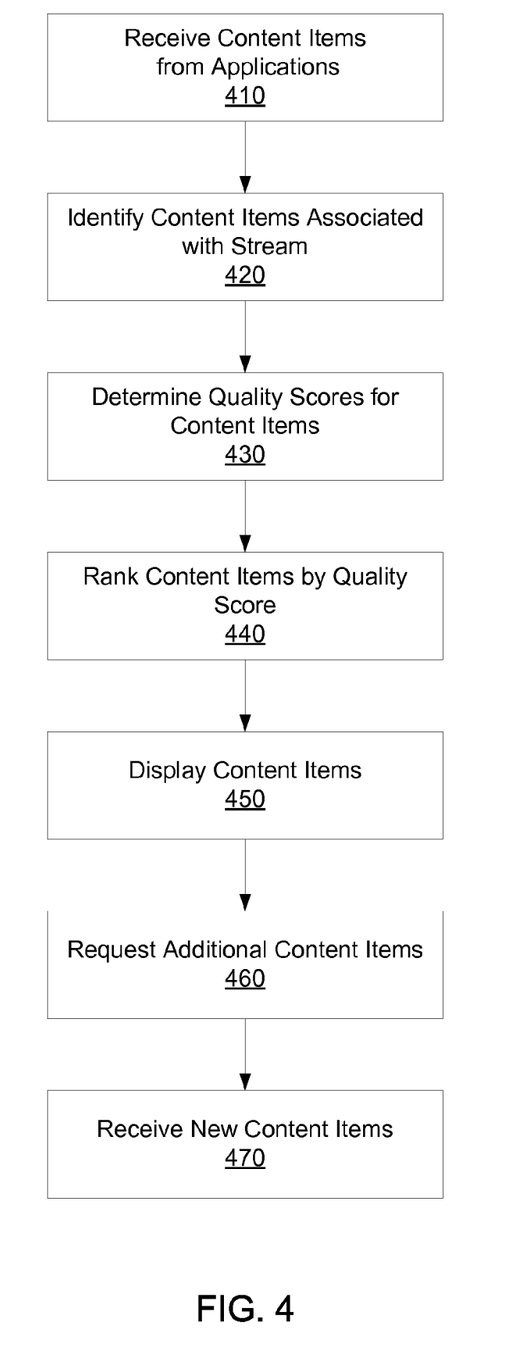
FIG. 4 shows a flow chart of one embodiment of a method for generating a content stream of digital content on a client device, in accordance with an embodiment.

FIG. 4 shows a flow chart of one embodiment of a method for generating a content stream of digital content for presentation by a client device 130. In one embodiment, the functionality described in conjunction with FIG. 4 is provided by the client device 130; however, in other embodiments, any suitable component or combination of components may provide the functionality described in conjunction with FIG. 4. For example, one or more of the described steps is performed in whole or in part by the content stream server 140. Additionally, in some embodiments, different and/or additional steps than those identified in FIG. 4 may be performed, or the steps identified in FIG. 4 may be performed in different orders.

An application executing on the client device 130 receives 410 one or more content items from multiple applications executing on the client device 130. For example, an application generating the content stream retrieves content items from two or more applications executing on the client device 130. As an example, one or more content items are received 410 from an application and one or more additional content items are retrieved from an additional application. Each content item received 410 by the application generating the content stream application is associated with one or more topics, as described above in conjunction with FIG. 2. For example, a topic associated with a content item indicates a genre of application (e.g., a news application, a social networking application, an e-mail application) from which the content item was received 410.

In some embodiments, receiving a content item includes providing authentication to a source 100 of the content item. Providing authentication enables access to content originating from a source 100 and presented through the content stream or through another application on the client device 130. For example, the source 100 is a social networking service and providing authentication grants access to content items from an account with the social networking service. Providing authentication may include presenting a knowledge-based authentication factor (e.g., a user name, a password) or a possession-based authentication factor (e.g., an access code sent to the client device 130). In one embodiment, authentication includes providing an access token compliant with an authorization protocol such as OAuth. One or more access tokens corresponding to a source are created by an application generating the content stream or an application from which a content item is received 410. For example, the application generating the content stream may create and store tokens for each application from which it retrieves content items. Authentication tokens may be stored and shared across applications if two or more of the applications require authentication with the same source 100. This sharing of created access tokens beneficially avoids multiple authentication logins by the user or the creation of multiple tokens for the same service.

Based on one or more topics associated with the received content items, one or more content items are identified 420 for inclusion in a content stream. For example, a set of content items are identified 420 from content items received 410 from an application and content items received 410 from an additional application. In one embodiment, the one or more topics associated with each of the received content items are compared to a stream topic associated with the content stream, and content items associated with at least a threshold number of topics matching, or similar to, the stream topic are identified 420 for inclusion in the content stream. A topic associated with a content item indicates a characteristic of the content item such as an application from which the content item was received 410, a genre of application from which the content item was received 410, a source 110 associated with the content item, a genre of source 110 associated with the content item, a category associated with the content item, a type associated with the content item, or one or more keywords associated with the content item. A content item may be explicitly associated with one or more topics or the client device 130 or content stream server 140 infers one or more topics associated with the content item based on characteristics of the content item. A content stream is associated with one or more stream topics. For example, a received content item is identified 420 for inclusion in a content stream about social media because the content item was received 410 from an application associated with a social networking system. As another example, news articles and social media content having keywords associated with speed skating are identified 420 for inclusion in a content stream having a stream topic of "Dutch sports." For an example content stream based on news stories, content items are associated with a topic of "news" are identified 420 for inclusion in the example content stream. The client device 130 may generate multiple content streams, with each content stream associated with one or more stream topics. In various embodiments, the stream topics associated with various content streams may be specified by the user of the client device 130 or may be specified by one or more pre-configured settings stored by the client device 130.

A quality score is determined 430 for each of the content items identified 420 for inclusion in a content stream. In one embodiment, the quality score associated with a content item is based at least in part on a relevance score providing a measure of the user's expected interest in the content item. The relevance score may be based at least in part on user preferences and previous interactions by the user with additional content items having at least a threshold similarity to the content item. For example, data from the relevance store 205 indicating relevance of a content item to a user of the client device 130 (based on an implied connection between the content item and one or more previously-presented content items with which the user interacted) is used to determine 430 a quality score associated with the content item. As another example, information indicating the relevance of attributes of a content item (e.g., keyword, author, source 110, category, or topic) towards a user based on characteristics of the user is used to determine 430 a quality score associated with the content item. In another example, user preferences for attributes of content items (e.g., a genre of application, an application, a topic, etc.) stored by the client device 130 are used along with attributes of content items to determine 430 quality scores for various content items. A quality score for content items may be based in part on general indications of a content item's popularity among various users of the content stream server 140 (e.g., associated view, likes, shares), as described above in conjunction with FIG. 2.

In one embodiment, a quality score is determined 430 for a content item based in part on indicating relevance of a content item to a user of the client device 130 and based in part on elements of the content item. For example, content items with one or more elements including animation content receive a higher quality score than content items with an image content element but no animation content element. As another example, the client device 130 verifies that content items in the content items identified 420 for inclusion in the content stream include one or more elements allowing generation of a preview of the content item (e.g., a primary image, a headline). In this example, quality scores for content items lacking one or more elements allowing generation of previews are reduced. Additionally, a quality score associated with a content item may be modified to increase diversity of the content items presented within a content stream, as described above in conjunction with FIG. 2.

Based at least in part on the determined quality scores, the content items identified 420 for inclusion in the content stream are ranked 440. In one embodiment, content items are ranked from highest quality score to lowest quality score, so a content item having a higher position in the ranking has a larger quality score than other content items with lower positions in the ranking Based on the ranking of content items, a display set of the identified content items is selected and displayed 450. The display set of content items may be displayed 450 based at least in part on the ranking, with the ranking of a content item in the display set affecting a slot in a stream template used to display 450 the display set of content items. For example, the display set of the identified content items includes content items having at least a threshold quality score or having at least a threshold position in the ranking. In some embodiments, the number of slots in a stream template for displaying the display set specifies a number of content items included in the display set. When displaying content items from the display set, a quality score associated with a content item included in the display set may be used to select a slot in a stream template used to display 450 the content item. For example, content items in the display set with higher quality scores or higher positions in the ranking are associated with slots of a stream template having more prominent display positions (e.g., slots having a larger size or a position closer to the top of a stream template).

The user may interact with the displayed content items according to input received through the input device 134. In one embodiment, if a user interacts with a displayed content item, the application from which the content item was received 410 is initiated, allowing the user to further interact with the content item using the application. For example, the client device 130 receives an input selecting a content item from the display set of content items and executes an application associated with the selected content item to display the selected content item. In one embodiment, the application presenting the content stream generates an access token for authentication with a source 100 of a presented content item. When the user interacts with a content item, the client device 130 executes another application associated with the content item and passes the generated authentication token to the other executed application. The other application uses this access token for authorization with the source 100, which beneficially avoids a duplicate authentication process for the other application.

In one embodiment, additional content items are requested 460 from multiple applications executing on the client device 130 and received 470 from one or more of the applications, allowing the content stream to be modified over time to include different or additional content items. In one embodiment, additional content items are periodically requested 460 from various applications or are requested 460 when a user accesses a content stream. Based on the additional content items received 470 from applications, the content stream is modified, as described above, to display 450 one or more of the additional content items received 470 from various applications. For example, the content stream is updated to display one or more content items that were not previously displayed. The content stream may be updated at specified intervals or in response to a received user input. Other suitable conditions may cause additional content items to be requested, such as display of a content item that was not previously displayed 450. For example, a count of content items in a content stream that have not been displayed to a user is maintained, and additional content items are requested 460 when the count is less than a threshold.

Alternatively or additionally, one or more applications may push content items to an application generating the content stream, so the content items are received 470 without being requested.

SUMMARY

The foregoing description of the embodiments of the invention has been presented for the purpose of illustration; it is not intended to be exhaustive or to limit the invention to the precise forms disclosed. Many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating a content stream of digital content on a client device, the method comprising:
   receiving one or more content items from an application executing on the client device, each content item associated with one or more topics;
   receiving one or more additional content items from an additional application executing on the client device, each additional content item associated with one or more topics;
   identifying a set of content items selected from the one or more content items and the one or more additional content items based on matching the one or more topics associated with the one or more content items and the one or more topics associated with the one or more additional content items with a stream topic associated with the content stream;
   determining, by a processor, a quality score associated with each content item from the set of content items;
   ranking the content items in the set of content items based at least in part on the determined quality scores; and
   displaying, via the client device, a display set of one or more content items selected from the set of content items based at least in part on the ranking.

2. The method of claim 1, wherein determining, by the processor, the quality score for each content item from the set of content items comprises:
   determining a relevance score for each content item from the set of content items, the relevance score associated with a content item from the set of content items providing a measure of interest of a user of the client device for the content item from the set of content items; and
   determining the quality score for each content item based at least in part on the relevance scores.

3. The method of claim 2, wherein the relevance score associated with the content item from the set of content items is based at least in part on one or more selected from a group consisting of: preferences of the user, one or more prior interactions by the user with content items having at least a threshold similarity to the content item from the set of content items, and any combination thereof.

4. The method of claim 2 wherein the relevance score associated with the content item from the set of content items is based at least in part on one or more selected from a group consisting of: demographic information associated with the user, a location associated with the user, and any combination thereof.

5. The method of claim 1, wherein determining, by the processor, the quality score for each content item from the set of content items comprises:
   identifying content items from the set of content items each associated with a common topic;
   ranking the identified content items based at least in part on their associated quality scores;
   applying a penalty to the quality score one or more of the identified content items based at least in part on positions of the one or more identified content items in the ranking.

6. The method of claim 1, wherein a quality score for a content item in the set of content items is based at least in part on a total number of interactions with the content item.

7. The method of claim 1, wherein displaying, via the client device, the display set of one or more content items selected from the set of content items based at least in part on the ranking comprises:

selecting a stream template including one or more slots configured to present one or more content items and specifying positions in which the one or more content items are displayed;

associating one or more content items from the display set with one or more slots included in the stream template; and displaying the one or more content items from the display set in positions relative to each other specified by the slots associated with each of the one or more content items from the display set.

8. The method of claim 7, wherein associating one or more content items from the display set with one or more slots included in the stream template comprises:

associating a content item from the display set with a slot included in the stream template based at least in part on a quality score associated with the content item from the display set and a position of the slot within the stream template.

9. The method of claim 1, further comprising:

receiving an input from a user via the client device;

identifying an additional content stream associated with an additional stream topic in response to the received input; and displaying content items associated with the additional content stream via the client device and hiding the display set of content items.

10. The method of claim 1, further comprising:

receiving an input selecting a content item from the display set of content items;

executing an application associated with the selected content item; and displaying the selected content item using the application associated with the selected content item.

11. The method of claim 1, wherein displaying, via the client device, a display set of one or more content items selected from the set of content items based at least in part on the ranking comprises:

displaying the display set of one or more content items when the client device is in a state where the client device accepts a reduced set of inputs.

12. The method of claim 1, wherein identifying the set of content items selected from the one or more content items and the one or more additional content items is based at least in part on characteristics of the application and characteristics of the additional application.

13. A method for generating a content stream of digital content on a client device, the method comprising:

receiving one or more content items from an application executing on the client device, each content item associated with one or more topics;

receiving one or more additional content items from an additional application executing on the client device, each additional content item associated with one or more topics;

identifying a set of content items selected from the one or more content items and the one or more additional content items based on matching the one or more topics associated with the one or more content items and the one or more topics associated with the one or more additional content items with a stream topic associated with the content stream; and displaying, via the client device, a display set of content items based at least in part on slots in a stream template associated with content items from the display set and specifying positions of content items from the display set relative to each other, the display set including one or more content items selected from the identified set.

14. The method of claim 13, wherein displaying, via the client device, the display set of content items comprises:

determining, by a processor, a quality score associated with each content item from the set of content items;

ranking the content items in the set of content items based at least in part on the determined quality scores;

selecting the display set based at least in part on the ranking; and displaying the display set based at least in part on slots in the stream template associated with content items from the display set.

15. The method of claim 14, wherein determining, by the processor, the quality score for each content item from the set of content items comprises:

determining a relevance score for each content item from the set of content items, the relevance score associated with a content item from the set of content items providing a measure of interest of a user of the client device for the content item from the set of content items; and determining the quality score for each content item based at least in part on the relevance scores.

16. The method of claim 15, wherein the relevance score associated with the content item from the set of content items is based at least in part on one or more selected from a group consisting of: preferences of the user, one or more prior interactions by the user with content items having at least a threshold similarity to the content item from the set of content items, and any combination thereof.

17. The method of claim 15 wherein the relevance score associated with the content item from the set of content items is based at least in part on one or more selected from a group consisting of: demographic information associated with the user, a location associated with the user, and any combination thereof.

18. The method of claim 13, further comprising:

receiving an input selecting a content item from the display set of content items;

executing an application associated with the selected content item; and displaying the selected content item using the application associated with the selected content item.

19. A computer program product comprising a computer-readable storage medium having instructions encoded thereon that, when executed by a processor, cause the processor to:

receive one or more content items from an application executing on a client device, each content item associated with one or more topics;

receive one or more additional content items from an additional application executing on the client device, each additional content item associated with one or more topics;

identify a set of content items selected from the one or more content items and the one or more additional content items based on matching the one or more topics associated with the one or more content items and the one or more topics associated with the one or more additional content items with a stream topic associated with the content stream; and display, via the client device, a display set of content items based at least in part on slots in a stream template associated with content items from the display set and specifying positions of content items from the display set relative to each other, the display set including one or more content items selected from the identified set.

20. The computer program product of claim 19, wherein displaying, via the client device, the display set of content items comprises:
- determining, by the processor, a quality score associated with each content item from the set of content items;
- ranking the content items in the set of content items based at least in part on the determined quality scores;
- selecting the display set based at least in part on the ranking; and
- displaying the display set based at least in part on slots in the stream template associated with content items from the display set.

* * * * *